United States Patent
Doddavula et al.

(10) Patent No.: US 9,329,916 B2
(45) Date of Patent: May 3, 2016

(54) METHOD FOR DETERMINING AVAILABILITY OF A SOFTWARE APPLICATION USING COMPOSITE HIDDEN MARKOV MODEL

(75) Inventors: Shyam Kumar Doddavula, Bangalore (IN); Mudit Kaushik, Mawana (IN)

(73) Assignee: Infosys Technologies, Ltd., Bangalore (IN)

( * ) Notice: Subject to any disclaimer, the term of this patent is extended or adjusted under 35 U.S.C. 154(b) by 41 days.

(21) Appl. No.: 13/329,989

(22) Filed: Dec. 19, 2011

(65) Prior Publication Data

US 2012/0260134 A1    Oct. 11, 2012

(30) Foreign Application Priority Data

Apr. 7, 2011    (IN) .............. 1213/CHE/2011

(51) Int. Cl.
*G06F 11/00*    (2006.01)
(52) U.S. Cl.
CPC .................... *G06F 11/008* (2013.01)
(58) Field of Classification Search
CPC ................................................ G06F 11/008
USPC ............... 714/15, 20, 21, 37, 38.1, 49
See application file for complete search history.

(56) References Cited

U.S. PATENT DOCUMENTS

| | | | |
|---|---|---|---|
| 6,334,196 B1 * | 12/2001 | Smorodinsky et al. | 714/37 |
| 7,024,580 B2 * | 4/2006 | Guimbellot et al. | 714/1 |
| 7,158,926 B2 * | 1/2007 | Kampe | 703/22 |
| 7,426,554 B2 * | 9/2008 | Kennedy | 709/223 |
| 2002/0002448 A1 * | 1/2002 | Kampe | 703/22 |
| 2003/0079154 A1 * | 4/2003 | Park et al. | 714/1 |
| 2009/0249241 A1 * | 10/2009 | Hoffmann | 715/772 |
| 2013/0019008 A1 * | 1/2013 | Jorgenson et al. | 709/224 |

OTHER PUBLICATIONS

Roshandel, R.; "Calculating Architectural Reliability via Modeling and Analysis;" a dissertation presented to the faculty of the Graduate School University of Southern California; Dec. 2006; Chapter 3, Sections 3.2.4 & 3.2.5: pp. 72-80.*
S. Banerjee, C. A. Mattmann, N. Medvidovic, and L. Golubchik; "Leveraging Architectural Models to Inject Trust into Software Systems;" Proc. of SESS'05, 2005; pp. 1-7.*
Tian, Jing and Yang, Yafei Dai; "A Data Placement Scheme with Time-Related Model for P2P Storages;" 7th IEEE International Conference on P2P Computing; 2007; pp. 151-158.*

* cited by examiner

*Primary Examiner* — Joseph Kudirka
(74) *Attorney, Agent, or Firm* — LeClairRyan, a Professional Corporation (57) ABSTRACT

A method and system for determining availability of a software application using Composite Hidden Markov Model (CHMM). The software application is divided into a plurality of layers which are further divided into sub-components. The configurations and dependencies of the sub-components are identified and also the state of the sub-components is determined. The state of the sub-components is represented in CHMM using state space diagram. The failure rate and recovery time of the sub-components is computed using the state space diagram and the respective transition tables are derived from the CHMM to determine the availability of the layers. The availability of the layers is combined to determine the availability of the software application.

21 Claims, 5 Drawing Sheets

METHOD FOR DETERMINING AVAILABILITY OF A SOFTWARE APPLICATION USING COMPOSITE HIDDEN MARKOV MODEL

This application claims the benefit of Indian Patent Application Filing No. 1213/CHE/2011, filed Apr. 7, 2011, which is hereby incorporated by reference in its entirety.

TECHNICAL FIELD

The present disclosure relates to the quality of service and related application in various fields like cloud computing. More particularly, the embodiments of the disclosure relate to a method for determining availability of a software application using Composite Hidden Markov Model (CHMM).

BACKGROUND OF THE DISCLOSURE

The conventional system provides Reliability Block Diagrams (RDB) which is too simplistic with support for only binary states. These states don't adequately model the different states of a software component or system, like a state with reduced functionality. Also, modeling a complex software system with Markov Model results in a complex model with unmanageable number of states which is difficult to use for computations.

The present disclosure describes how to improve on existing Markov Models & Hidden Markov Models through the implementation of encapsulation using the process of decomposition of the software application into sub-units. This approach can be used for modeling the complete software application. The model achieved from this method is a combined result of many Markov Models or Hidden Markov Models at the sub-units level. Hence it is called a Composite Hidden Markov Model (CHMM) at the system level. It also explains how to combine the mathematical models with measured values and how to apply probability theory to solve the uncertainties in estimating availability of complex software systems.

SUMMARY

This section provides a general summary of the disclosure, and is not a comprehensive disclosure of its full scope or all of its features.

Additional features and advantages are realized through the techniques of the present disclosure. Other embodiments and aspects of the disclosure are described in detail herein and are considered a part of the claimed disclosure.

An exemplary embodiment of present disclosure provides a method for determining availability of a software application using CHMM. The method comprises acts of dividing the software application into sub-units, wherein the sub-units comprises of layers having sub-components. The configurations and dependencies of the sub-units are determined. Also, the state of the sub-units are determined and represented in the CHMM using the state space diagram. The failure rate and recovery time of the sub-units are determined using the state space diagram; and the respective transition tables are derived from the CHMM to determine the availability of the sub-units. The availability of the sub-units is combined to determine the availability of the software application.

An embodiment of the present disclosure provides a system for determining availability of a software application comprising a processor to determine the availability of the software application by determining failure rate and recovery time of layers of the software application and a display unit to display the availability of the software application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Embodiments of the present disclosure relate to a method and a system for determining availability of the software application using Composite Hidden Markov Model (CHMM).

Figure 1:
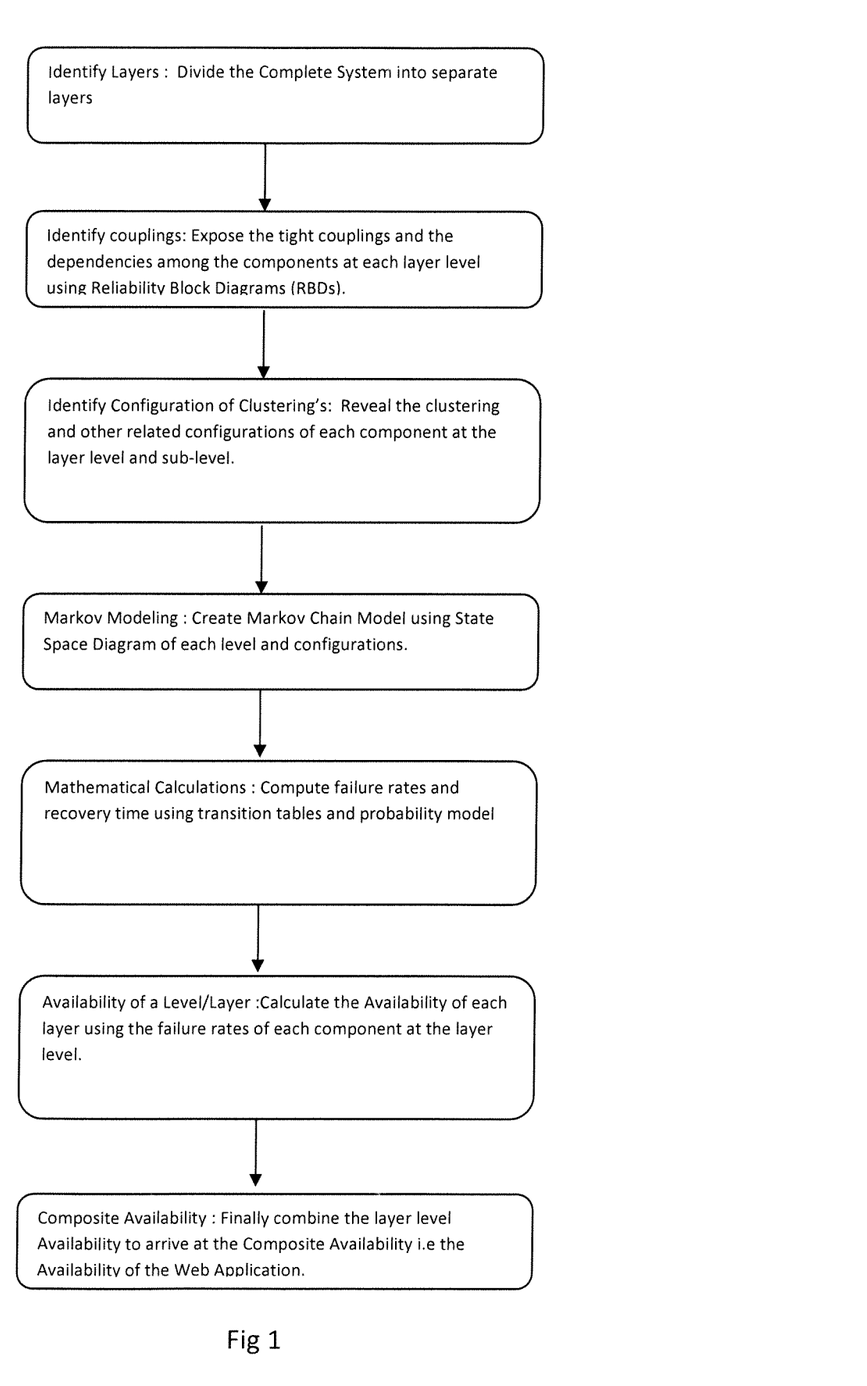
FIG. 1 is an exemplary flow chart which illustrates stepwise process for determining availability of a software application.

FIG. 1 diagrammatically illustrates the steps for determining the availability of a software application using CHMM. In one embodiment, the software application is divided into sub-units wherein the sub-units comprise of layers having sub-components. The configurations and dependencies of the sub-components are identified. The state of the sub-components is determined and the state is represented in CHMM using state space diagram. The failure rate and recovery time of the sub-components are determined using the state space diagram and the respective transition tables are derived from the state space diagram to determine the availability of the sub-units. The availability of the sub-units is then combined to determine the availability of the software application which is displayed in the display unit.

Figure 2A:
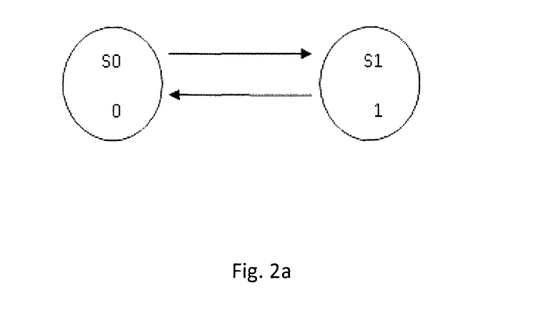
FIGS. 2a and 2b illustrates state space diagram for a software application using Markov Model and Hidden Markov Model respectively.

Any software application can be divided into two states UP and DOWN. The Markov Model for the software application is as shown in FIG. 2a wherein Node S0 represents the state in which the software application is fully functional and is depicted as '0' i.e UP and Node S1 represents the state of non-working of the software application and is depicted as '1'i.e DOWN. Assuming that the rate of failure of the software application is given by $\lambda_{SA}$ and Mean time to repair (MTTR) the failure is given by $\mu_{SA}$ and since the Mean time between Failure is equal to the inverse of the rate of the failure i.e $$MTBF = \frac{1}{\lambda_{SA}}$$

The availability of any system ($A_{sys}$) is given by $$A_{sys} = \frac{MTBF}{MTBF + MTTR}$$

The software application can be down due to various reasons like maintenance, minor faults, or the major faults and hence Mean Time to Repair would vary in each case. So for the entire work we are assuming that we have taken into consideration the variability attached to the repair time and calculation of the MTTR is carried out using simple Markov Model or the Hidden Markov Model as shown in FIG. 2b. as per the need.

Figure 2B:
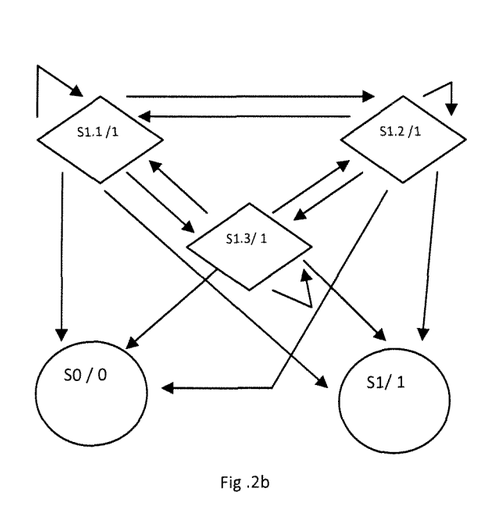

In FIG. 2b the DOWN state of S1 has been broken down into more granular form S1.1, S1.2, S1.3 in which the states S1.1, S1.2, S1.3 are not directly visible to the user (the case of Hidden Markov Model), but output, dependent on the state, is visible. Assuming that the state S1.1 represents the failure due to "minor" fault and can be overcome by simple "restart" of the system which will take time T1.1, the state S1.2 results into non-working of the software application due to "major" fault and require greater fixation time T1.2 and the state S1.3 is an outcome of the forced non-functionality of the software application as the "maintenance" is going on which requires time T1.3 for repair, the Mean Time to Repair is given by, $$MTTR(\mu_{SA}) = \frac{\sum_{i=1}^{n} T_{1,i}}{n}$$

Where n=3 and $T_{1,i} > 0$ and the failure rate of the complete software application is given by $$FailureRate(\lambda_{SA}) = \sum_{i=1}^{3} \lambda_{1,i}$$

Figure 3A:
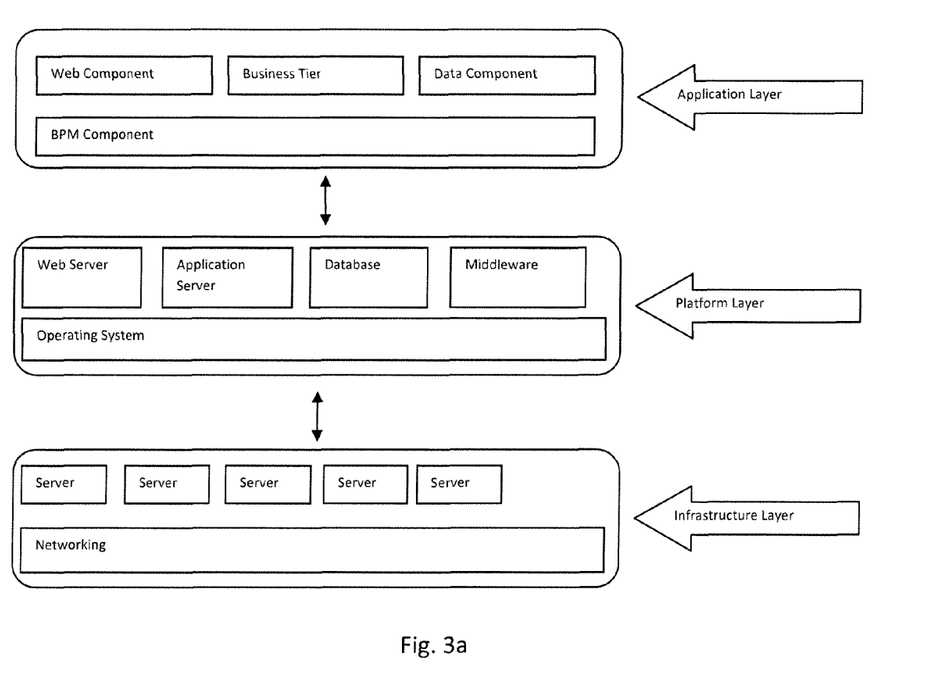
FIG. 3a is an exemplary block diagram illustrating division of software application into multiple layers.

FIG. 3a illustrates the division of software application into sub-units having sub-components to determine the availability of the software application. In one embodiment, the software application is divided into sub-units of application layer, platform layer and infrastructure layer wherein the sub-units further comprises of sub-components. The application layer sub-components include web component, business tier component, data component and Business Process Management (BPM) component, the platform layer sub-components include web server, application server, database, middle ware and operating system and the infrastructure layer sub-components include server and network. The Composite Markov Model using state space diagram is created for the sub-components to determine the availability of the sub-units.

Assuming that the Business tier sub-component of the application layer has two implementations such as, implementation 1 and implementation 2. The software application would be in working state if any of these two implementations are working or both are working. The Markov Model for the business tier sub-component is created using the state space diagram as shown in FIG. 3b.

Figure 3B:
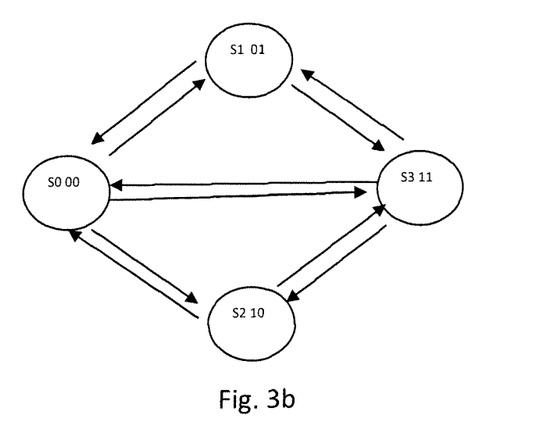
FIG. 3b illustrates state space diagram for Business tier sub-component of the application layer.

In FIG. 3b, Node S0 represents the state in which both the implementations are working. Node S1 represents the state in which implementation 1 is working and implementation 2 is not working. Node S2 represents the state in which implementation 1 is not working but implementation 2 is working. Node S3 represents the state in which both the implementations are not working. The failure rate of the business tier component and its recovery time when there is transition of state from S0 to S1 is determined. Similarly the failure rate and recovery time of each transition in the Markov Model would give the transition table as shown in the below transition table 1.

TABLE 1

| NODE TO NODE | FAILURE RATE | MEAN TIME TO REPAIR (MTTR) |
| --- | --- | --- |
| S0 TO S1 | $\lambda_{I1}$ | $\mu_{I1}$ |
| S0 TO S2 | $\lambda_{I2}$ | $\mu_{I2}$ |
| S1 TO S3 | $\lambda_{I2}$ | $\mu_{I2}$ |
| S2 TO S3 | $\lambda_{I1}$ | $\mu_{I1}$ |
| S0 TO S3 | $\lambda_{B}$ | $\mu_{B}$ |

The failure rate of the business tier sub-component ($\lambda_1 B$) is calculated from the transition table 1 using the formula:

$$\lambda_B = \frac{\frac{\lambda_{I2} \cdot \lambda_{I2}}{\lambda_{I2} + \mu_{I1}} + \frac{\lambda_{I2} \cdot \lambda_{I2}}{\lambda_{I2} + \mu_{I2}}}{1 + \frac{\lambda_{I2}}{\mu_{I1} + \lambda_{I2}} + \frac{\lambda_{I2}}{\mu_{I2} + \lambda_{I2}}}$$

Where, $\lambda_B$ is the failure rate of the business tier sub-component, $\lambda_{I1}$ is the failure rate of implementation 1, $\lambda_{I2}$ is the failure rate of implementation 2, $\mu_{I1}$, is the recovery time of implementation 1, and $\mu_{I2}$ is the recovery time of implementation 2.

Now the availability of the business tier sub-component ($A_B$) is determined by using the formula:

$$\Lambda_B = \frac{MTBF}{MTBF + MTTR}$$

Where, $$MTBF = \frac{1}{\lambda_B}$$

Similarly, the availability of the remaining sub-components of the Application Layer is found to determine the availability of the application layer.

In an embodiment, the availability of the Application Layer is determined by aggregating the availability of the sub-components of the Application Layer which is given by the equation:

$$A_{AL} = A_{DC} \cdot A_B \cdot A_{WC} \cdot A_{BC}$$

Where, $A_{DC}$ is the Availability of the Data component, $A_B$ is the Availability of the Business tier component, $A_{WC}$ is the Availability of the web component, and $A_{BC}$ is the Availability of the BPM component.

In an embodiment, the availability of the Application Server sub-component of the Platform Layer depends upon the availability of the configurations of the Application Server cluster. The configurations can either be Active-Passive or Active-Active.

Figure 3C:
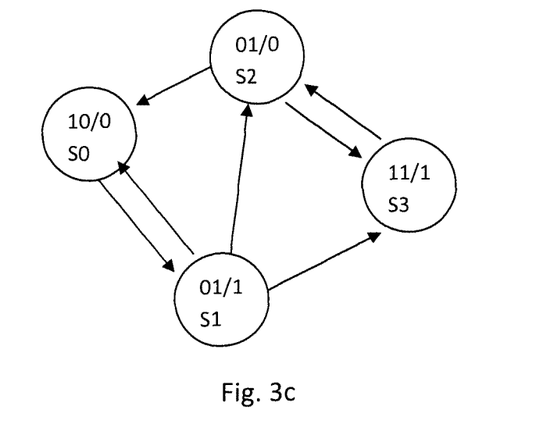
FIG. 3c illustrates state space diagram for Application Server cluster in Active-Passive configuration.

The availability of the Application Server cluster with Active-Passive configuration is determined by creating a Markov Model using the state space diagram as shown in FIG. 3c In Active-Passive configuration initially only one sever would be catering the entire request from client and would be handling the complete load and marked as active state. But in case it meets some failure or goes down then the other server which is in the passive state will get activated and take the charge of full load. So in every condition only one server would be handling the load of the software application unless both the server fails and the Application Server cluster goes down.

In FIG. 3c Node S0 represents the state in which one server is in active state and the other is in passive state and hence the Application Server cluster is in working state. Node S1 represents the state in which the previously active server goes down and the passive server is about to get activated and hence the Application Server cluster is in non-working state. Node S2 represents the state in which the passive server gets activated and receives the entire request from the client and hence the Application Server cluster is in working state and Node S3 represents the state in which both the active as well as the passive server meets some failure and goes down and hence the Application Server cluster is in non-working state.

The failure rate of the Application Server cluster in Active-Passive configuration and its recovery time when there is transition of state from S0 to S1 is determined. Similarly the failure rate and recovery time of each transition in the Markov Model would give the transition table 2 as shown below.

TABLE 2

| Node to Node | Failure Rate/ Activation Time | Mean Time to Repair (MTTR) |
| --- | --- | --- |
| S0 to S1 | $\lambda_1$ | $\mu_1$ |
| S1 to S3 | $\lambda_2$ | |
| S1 to S2 | $\mu_A$ | |

TABLE 2-continued

| Node to Node | Failure Rate/ Activation Time | Mean Time to Repair (MTTR) |
| --- | --- | --- |
| S2 to S0 | $\mu_3$ | |
| S3 to S2 | | $\mu_2$ |
| S2 to S3 | $\lambda_2$ | |

The failure rate of the Application Server in Active-Passive configuration ($\lambda_{AS}$) is calculated from the transition table 2 using the formula:

$$\lambda_{AS} = \frac{\lambda_1 \cdot \lambda_2 \cdot (\mu_o + \lambda_2 + \mu_A)}{D \cdot \mu_2 (\mu_1 + \lambda_2 + \mu_A)}$$

Where, $\lambda_1$ is the rate of failure during the transition of state from S0 to S1, $\lambda_2$ is the rate of failure during the transition of state from S1 to S3, $\mu_A$ is the activation time taken during the transition of state from S1 to S2, $\mu_1$ is the recovery time taken during the transition of state from S0 to S1, $\mu_3$ is the rate of failure during the transition of state from S2 to S0, and $$D = 1 + \frac{2\lambda_1(\mu_2 + \lambda_2 + \mu_A)}{\mu_3(\mu_1 + \lambda_2 + \mu_A)}$$

Now the availability of the Application Server cluster in Active-Passive configuration ($\lambda_{AS}$) is determined by using the formula:

$$A_{AS} = \frac{MTBF}{MTBF + MTTR}$$

Where, $$MTBF = \frac{1}{\lambda_{AS}}$$

Figure 3D:
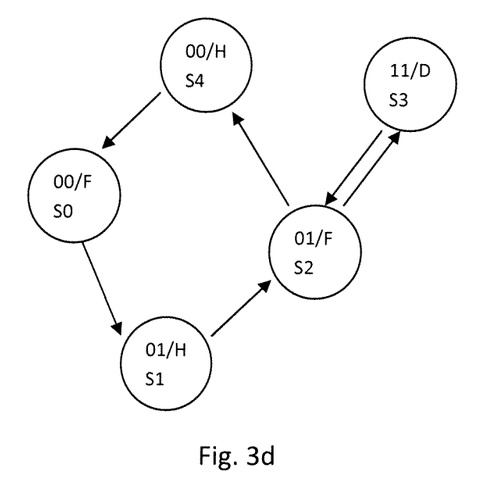
FIG. 3d illustrates state space diagram for Application Server cluster in Active-Active configuration.

The availability of the Application Server cluster with Active-Active configuration is determined by creating a Markov Model using the state space diagram as shown in FIG. 3d. In Active-Active configuration unlike Active-Passive configuration both the server would be catering the request from client in sharing mode like half-half of the load (50% each). But in case if one of the servers goes down due to some failure then the complete load will be handled by the single server.

In FIG. 3d Node S0 represents the state in which both the servers are working properly and hence the Application Server cluster is handling Full load (F) and thus in the full working state. Node S1 represents the state in which one of the servers goes down and the other server is handling only its share of load and hence the Application Server cluster is handling only half of the load (H) and thus in half working state. Node S2 represents the state in which only the working server takes over the charge of all load and hence the Application Server cluster is handling the Full load (F) and thus in full working state. Node S3 represents the state in which both the server meet some failure and goes down and hence the Application Server cluster is Down (D) and thus in non-working state. Node S4 represents the state in which the failed server gets repaired but yet to get into active mode to handle its share of load and the other server is handling only half of the total load (H).

The failure rate of the Application Server cluster in Active-Active configuration and its recovery time in the Markov Model would give the transition table 3 as shown below.

TABLE 3

| Node to Node | Failure Rate/ Activation Time | Mean Time to Repair (MTTR) |
|---|---|---|
| S0 to S1 | $\lambda_1$ | |
| S1 to S2 | $\mu_A$ | |
| S3 to S2 | $\mu_1$ | |
| S4 to S0 | $\mu_A$ | |
| S2 to S3 | $\lambda_2$ | $\mu_2$ |

The failure rate of the Application Server cluster in Active-Active configuration ($\lambda_{AS}$) is calculated from the transition table 3 using the formula:

$$\lambda_{AS} = \lambda_2 \cdot \frac{\frac{\lambda_1}{\mu_1}}{1 + \frac{2\lambda_1}{\mu_A} + \frac{\lambda_1}{\mu_1} + \frac{\lambda_1 \lambda_2}{\mu_1 \mu_2}}$$

Where, $\lambda_1$ is the rate of failure during the transition of state from S0 to S1, $\lambda_2$ is the rate of failure during the transition of state from S2 to S3, $\lambda_A$ is the activation time taken during the transition of state from S1 to S2, $\lambda_1$ is the recovery time taken during the transition of state from S3 to S2, $\lambda_2$ is the recovery time taken during the transition of state from S2 to S3.

Now the availability of the Application Server cluster in Active-Active configuration ($\lambda_{AS}$) is determined by using the formula:

$$A_{AS} = \frac{MTBF}{MTBF + MTTR}$$

Where, $$MTBF = \frac{1}{\lambda_{AS}}$$

Further, the availability of the Platform Layer is determined by aggregating the availability of the sub-components of the Platform Layer which is given by the equation:

$$A_{PL} = A_{OS} \cdot A_{AS} \cdot A_{BC}$$

Where, $A_{OS}$ is the Availability of the Operating System, $A_{AS}$ is the Availability of the Application Server and $A_{RC}$ is the Availability of the rest of the sub-components of the Platform Layer.

Also, the availability of the Infrastructure Layer is determined by aggregating the availability of the sub-components of the Infrastructure layer which is given by the equation:

$$A_{IL} = A_S \cdot A_N$$

Where, $A_S$ is the Availability of the Server and $A_N$ is the Availability of the Network.

Thus, the availability of the software application is determined by aggregating the availability of the layers of the software application using the equation:

$$A_{WA} = A_{AL} \cdot A_{PL} \cdot A_{iL}$$

Where, $A_{AL}$ is the Availability of the Application Layer, $A_{PL}$ is the Availability of the Platform Layer and $A_{iL}$ is the Availability of the Infrastructure Layer.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for determining application availability, the method comprising:

identifying, by an availability determination computing device, one or more configurations or one or more internal dependencies of each of a plurality of sub-units of a same single instance of an application;

determining, by the availability determination computing device, at least one state of each of the plurality of sub-units and representing the at least one state in at least one Composite Hidden Markov Model (CHMM) using at least one state space diagram and based on the identified one or more configurations or one or more internal dependencies;

determining, by the availability determination computing device, a failure rate, activation time, and a recovery time of each of the plurality of sub-units based on one or more transition tables generated from the at least one CHMM, the activation time comprising a time to transition at least one of the plurality of sub-units from a passive state to an active state, and the recovery time corresponding to a plurality of failure states for the same single instance of the application in the one or more transition tables comprising a major failure state corresponding to the recovery time that equals or exceeds a predetermined time threshold and a minor failure state corresponding to the recovery time that is less than the predetermined time threshold;

determining, by the availability determination computing device, an availability of each of the plurality of sub-units based on the failure rate, the activation time, and the recovery time of each of the plurality of sub-units; and outputting, by the availability determination computing device, the determined availability of the application based on an aggregation of the availability of each of the plurality of sub-units.

2. The method as set forth in claim 1, wherein the plurality of sub-units comprises layers, layers comprising components, or layers comprising sub-components of components.

3. The method as set forth in claim 1, wherein the plurality of sub-units of the application comprises an application layer, a platform layer, or an infrastructure layer and one or more of the plurality of sub-units further comprises layers comprising sub-components.

4. The method as set forth in claim 1, wherein the plurality of sub-units of the application comprises an application layer comprising a plurality of sub-components comprising a web component, a business tier component, a data component, or a Business Process Management (BPM) component.

5. The method as set forth in claim 1, wherein the plurality of sub-units of the application comprises a platform layer comprising a plurality of sub-components comprising a web server, an application server, a database, a middleware, or an operating system.

6. The method as set forth in claim 1, wherein the plurality of sub-units of the application comprises an infrastructure layer comprising a plurality of sub-components comprising a server, or a network.

7. The method as set forth in claim 3, wherein the state space diagram further represents various states of the sub-components comprising an active-passive configuration or an active-active configuration.

8. An availability determination computing device, the device comprising:
- a processor;
- a memory coupled to the processor which is configured to be capable of executing programmed instructions, which comprise the programmed instructions stored in the memory to:
  - identify one or more configurations or one or more internal dependencies of each of a plurality of sub-units of a same single instance of an application;
  - determine at least one state of each of the plurality of sub-units and representing the at least one state in at least one Composite Hidden Markov Model (CHMM) using at least one state space diagram and based on the identified one or more configurations or one or more internal dependencies;
  - determine a failure rate, activation time, and a recovery time of each of the plurality of sub-units based on one or more transition tables generated from the at least one CHMM, the activation time comprising a time to transition at least one of the plurality of sub-units from a passive state to an active state, and the recovery time corresponding to a plurality of failure states for the same single instance of the application in the one or more transition tables comprising a major failure state corresponding to the recovery time that equals or exceeds a predetermined time threshold and a minor failure state corresponding to the recovery time that is less than the predetermined time threshold;
  - determine an availability of each of the plurality of sub-units based on the failure rate, the activation time, and the recovery time of each of the plurality of sub-units; and
  - output an availability of the application, the availability of the application based on an aggregation of the availability of each of the plurality of sub-units.

9. The device as set forth in claim 8, wherein the plurality of sub-units comprises layers, layers comprising components, or layers comprising sub-components of components.

10. The device as set forth in claim 8, wherein the plurality of sub-units of the application comprises an application layer, a platform layer, or an infrastructure layer and one or more of the plurality of sub-units further comprises layers comprising sub-components.

11. The device as set forth in claim 8, wherein the plurality of sub-units of the application comprises an application layer comprising a plurality of sub-components comprising a web component, a business tier component, a data component, or a Business Process Management (BPM) component.

12. The device as set forth in claim 8, wherein the plurality of sub-units of the application comprises a platform layer comprising a plurality of sub-components comprising a web server, an application server, a database, a middleware, or an operating system.

13. The device as set forth in claim 8, wherein the plurality of sub-units of the application comprises an infrastructure layer comprising a plurality of sub-components comprising a server, or a network.

14. The device as set forth in claim 10, wherein the state space diagram further represents various states of the sub-components comprising an active-passive configuration or an active-active configuration.

15. A non-transitory computer-readable medium having stored thereon instructions for application policy management, comprising machine executable code which when executed by at least one processor causes the processor to perform steps comprising:
- identifying one or more configurations or one or more internal dependencies of each of a plurality of sub-units of a same single instance of an application;
- determining at least one state of each of the plurality of sub-units and representing the at least one state in at least one Composite Hidden Markov Model (CHMM) using at least one state space diagram and based on the identified one or more configurations or one or more internal dependencies;
- determining a failure rate, activation time, and a recovery time of each of the plurality of sub-units based on one or more transition tables generated from the at least one CHMM, the activation time comprising a time to transition at least one of the plurality of sub-units from a passive state to an active state, and the recovery time corresponding to a plurality of failure states for the same single instance of the application in the one or more transition tables comprising a major failure state corresponding to the recovery time that equals or exceeds a predetermined time threshold and a minor failure state corresponding to the recovery time less than the predetermined time threshold;
- determining an availability of each of the plurality of sub-units based on the failure rate, the activation time, and the recovery time of each of the plurality of sub-units; and
- outputting an availability of the application, the availability of the application based on an aggregation of the availability of each of the plurality of sub-units.

16. The medium as set forth in claim 15, wherein the plurality of sub-units comprises layers, layers comprising components, or layers comprising sub-components of components.

17. The medium as set forth in claim 15, wherein the plurality of sub-units of the application comprises an application layer, a platform layer, or an infrastructure layer and one or more of the plurality of sub-units further comprises layers comprising sub-components.

18. The medium as set forth in claim 15, wherein the plurality of sub-units of the application comprises an application layer comprising a plurality of sub-components comprising a web component, a business tier component, a data component, or a Business Process Management (BPM) component.

19. The medium as set forth in claim 15, wherein the plurality of sub-units of the application comprises a platform layer comprising a plurality of sub-components comprising a web server, an application server, a database, a middleware, or an operating system.

20. The medium as set forth in claim 15, wherein the plurality of sub-units of the application comprises an infrastructure layer comprising a plurality of sub-components comprising a server, or a network.

21. The medium as set forth in claim 17, wherein the state space diagram further represents various states of the sub-components comprising an active-passive configuration or an active-active configuration.

\* \* \* \* \*